US008764177B2

(12) United States Patent
Annable et al.

(10) Patent No.: US 8,764,177 B2
(45) Date of Patent: Jul. 1, 2014

(54) PRINTING PROCESS

(75) Inventors: Tom Annable, Manchester (GB); John Mayall, Manchester (GB)

(73) Assignee: Fujifilm Imaging Colorants Limited (GB)

( * ) Notice: Subject to any disclaimer, the term of this patent is extended or adjusted under 35 U.S.C. 154(b) by 97 days.

(21) Appl. No.: 13/502,553

(22) PCT Filed: Oct. 27, 2010

(86) PCT No.: PCT/GB2010/051799
§ 371 (c)(1), (2), (4) Date: Apr. 18, 2012

(87) PCT Pub. No.: WO2011/051711
PCT Pub. Date: May 5, 2011

(65) Prior Publication Data
US 2012/0212538 A1 Aug. 23, 2012

(30) Foreign Application Priority Data
Oct. 30, 2009 (GB) .................................. 0919038.0

(51) Int. Cl.
*B41J 2/01* (2006.01)
(52) U.S. Cl.
USPC .......................................................... 347/100
(58) Field of Classification Search
USPC .......................................................... 347/100
See application file for complete search history.

(56) References Cited

U.S. PATENT DOCUMENTS

| 5,645,888 A | 7/1997 | Titterington et al. |
|---|---|---|
| 5,746,818 A | 5/1998 | Yatake |
| 6,450,632 B1 | 9/2002 | Tsang et al. |
| 6,858,301 B2 | 2/2005 | Ganapathiappan |
| 7,370,956 B2 | 5/2008 | Figov |
| 2006/0210711 A1 | 9/2006 | Hayashi et al. |
| 2008/0002004 A1* | 1/2008 | O'Donnell et al. ............. 347/86 |
| 2009/0176927 A1 | 7/2009 | Park et al. |
| 2010/0112318 A1 | 5/2010 | McIntyre |

FOREIGN PATENT DOCUMENTS

WO   2006/064193 A1   6/2006

OTHER PUBLICATIONS

International Search Report and Written Opinion relating to corresponding PCT/GB2010/051799, issued Feb. 17, 2011.

* cited by examiner

*Primary Examiner* — Laura Martin
(74) *Attorney, Agent, or Firm* — Banner & Witcoff, Ltd.

(57) ABSTRACT

A process for printing an image on a substrate comprising the steps of: (a) applying an ink comprising polymer-encapsulated pigment particles and an aqueous medium to a substrate by means of an ink jet printer, wherein (i) the said particles are dispersed in the aqueous medium, and (ii) the said particles comprise a carboxy-functional dispersant crosslinked around a pigment core by a first crosslinking agent; and (b) crosslinking the polymer-encapsulated pigment particles with a second crosslinking agent. The process is particularly useful for printing polymeric substrates which come into contact with rubbing and/or moisture.

17 Claims, 1 Drawing Sheet

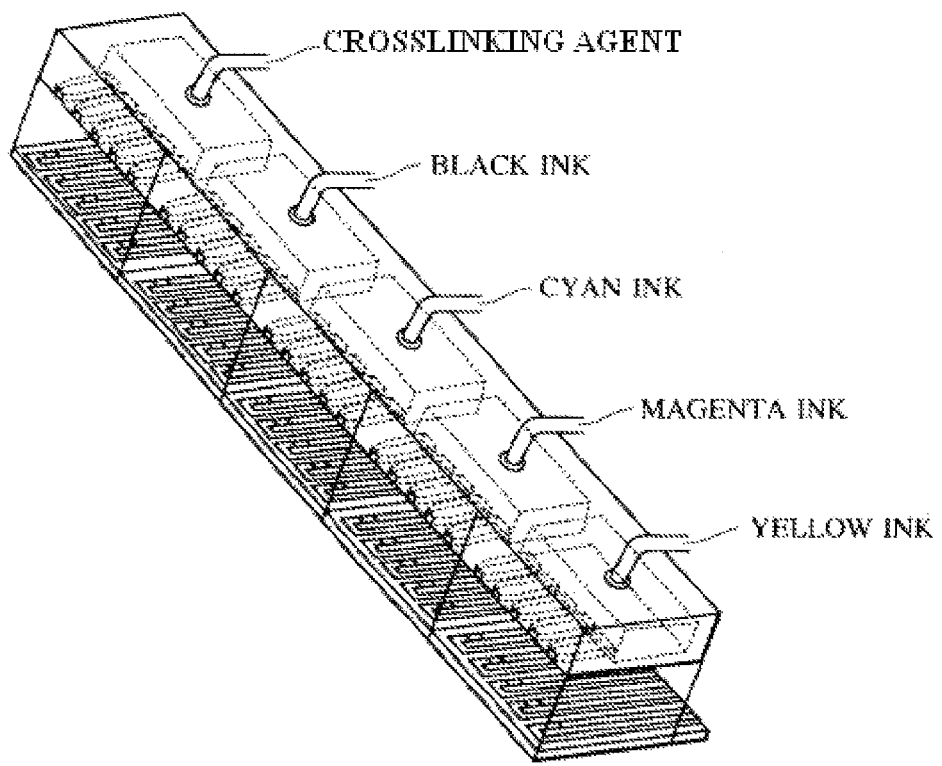

PRINTING PROCESS

RELATED APPLICATION DATA

This application is a National Stage Application under 35 U.S.C. 371 of co-pending PCT application PCT/GB2010/051799 designating the United States and filed Oct. 27, 2010; which claims the benefit of GB patent application number 0919038.0 and filed Oct. 30, 2009 each of which are hereby incorporated by reference in their entireties.

This invention relates to a process for ink jet printing and to ink jet printers and cartridges.

Ink jet printing ("IJP") is a non-impact printing technique in which droplets of an ink are ejected through a fine nozzle onto a substrate without bringing the nozzle into contact with the substrate.

There are many demanding performance requirements for inks used in IJP. For example they desirably provide sharp, non-feathered images having good water-fastness, light-fastness and optical density. The inks are often required to dry quickly when applied to a substrate to prevent smudging, but they should not form a crust over the tip of an ink jet nozzle because this will stop the printer from working. The inks should also be stable to storage over time without decomposing or forming a precipitate which could block the fine nozzle. The inks should also adhere well to the substrate and have good rub resistance, these being particular challenges when the substrate is has low or no porosity (e.g. plastics used in shampoo bottles and the like).

U.S. Pat. No. 6,450,632 describes the use of underprinting fluids containing cationic mordants to fix an over printed ink containing an anionic macromolecular colorant.

U.S. Pat. No. 5,746,818 describes an ink jet recording method in which a separately fired agent (typically a salt) is used to destabilise a pigment dispersion and cause the pigment to precipitate onto a substrate.

According to a first aspect of the present invention there is provided a process for printing an image on a substrate comprising the steps of:
(a) applying an ink comprising polymer-encapsulated pigment particles and an aqueous medium to a substrate by means of an ink jet printer, wherein
  (i) the said particles are dispersed in the aqueous medium, and
  (ii) the said particles comprise a carboxy-functional dispersant crosslinked around a pigment core by a first crosslinking agent; and
(b) crosslinking the polymer-encapsulated pigment particles using a second crosslinking agent.

FIG. 1 illustrates an ink jet printer cartridge suitable for use in the present processes. In this drawing, the crosslinking agent used in step (b) is incorporated into the topmost chamber and the coloured inks containing polymer-encapsulated pigment particles which may be crosslinked therewith are incorporated into the other chambers as illustrated.

Preferably the ink comprises:
(a) from 0.01 to 15 parts of the polymer-encapsulated pigment particles; and
(b) from 85 to 99.99 parts of an aqueous medium;
wherein all parts are by weight.

Preferably the number of parts of (a)+(b)=100. The number of parts of the polymer-encapsulated pigment particles is calculated on a 100% solids basis.

The number of parts of component (a) is preferably from 0.1 to 12, more preferably from 0.5 to 9, and especially from 1 to 5 parts. The number of parts of component (b) is preferably from 88 to 99.9, more preferably from 91 to 99.5 and especially from 95 to 99 parts.

Preferred aqueous media comprise water, an organic solvent and optionally a crosslinking agent.

When the aqueous medium (b) comprises a mixture of water and organic solvent, the weight ratio of water to organic solvent is preferably from 99:1 to 1:99, more preferably from 99:1 to 50:50 and especially from 95:5 to 80:20.

Preferably the organic solvent present in the mixture of water and organic solvent is a water-miscible organic solvent or a mixture of such solvents. Preferred water-miscible organic solvents include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; ketones and ketone-alcohols, preferably acetone, methyl ether ketone, cyclohexanone and diacetone alcohol; water-miscible ethers, preferably tetrahydrofuran and dioxane; diols, preferably diols having from 2 to 12 carbon atoms, for example pentane-1,5-diol, ethylene glycol, propylene glycol, butylene glycol, pentylene glycol, hexylene glycol and thiodiglycol and oligo- and polyalkyleneglycols, preferably diethylene glycol, triethylene glycol, polyethylene glycol and polypropylene glycol; triols, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2-(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone; cyclic esters, preferably caprolactone; sulfoxides, preferably dimethyl sulfoxide; and sulfones, preferably sulfolane. Preferably the liquid medium comprises water and 2 or more, especially from 2 to 8, water-miscible organic solvents.

Especially preferred water-miscible organic solvents are cyclic amides, especially 2-pyrrolidone, N-methyl-pyrrolidone and N-ethyl-pyrrolidone; diols, especially 1,5-pentane diol, ethyleneglycol, thiodiglycol, diethyleneglycol and triethyleneglycol; and mono-$C_{1-4}$-alkyl and $C_{1-4}$-alkyl ethers of diols, more preferably mono-$C_{1-4}$-alkyl ethers of diols having 2 to 12 carbon atoms, especially 2-methoxy-2-ethoxy-2-ethoxyethanol.

Aqueous media comprising larger amounts of organic solvent (e.g. above 40%) are particularly useful where fast drying times are required and particularly when printing onto hydrophobic and non-absorbent substrates, for example plastics, metal and glass.

The ink preferably has a viscosity of less than 45 mPa·s, more preferably less than 40 mPa·s and especially less than 37 mPa·s at a temperature of 25° C.

The ink preferably has a surface tension from 20 to 65 dynes/cm, more preferably from 25 to 50 dynes/cm at a temperature of 25° C.

The ink may also comprise additional components suitable for use in ink jet printing inks, for example a viscosity modifier, pH buffer (e.g. 1:9 citric acid/sodium citrate) corrosion inhibitor, biocide, dye and/or kogation reducing additive.

The ink may also contain a binder, e.g. a polymeric material capable of binding the composition after the liquid medium has evaporated away and/or been absorbed into the substrate.

Suitable binders include natural and synthetic polymers. Preferred binders include poly(meth)acrylates, polystyrenics, polyesters, polyurethanes, alkyds, polysaccharides (e.g. cellulose) and proteins (e.g. casein).

Inks suitable for use in step (a) may be obtained commercially from FUJIFILM Imaging Colorants Limited or its sister company in the USA.

Preferably the polymer-encapsulated pigment particles comprise a carboxy-functional dispersant crosslinked around a pigment core by a first crosslinking agent having at least two groups selected from oxetane, carbodiimide, hydrazide, oxazoline, aziridine, isocyanate, N-methylol, keteneimine, isocyanurate and epoxy groups, especially two or more epoxy groups.

The dispersant, prior to crosslinking with the first crosslinking agent, preferably has an acid value of at least 125 mg KOH/g.

The dispersant preferably has one or more oligomeric dispersing groups.

In order to be able to crosslink in step (b), the polymer-encapsulated pigment particles have carboxy groups (i.e. not all off the carboxy groups in the dispersant are crosslinked to form the polymer-encapsulated pigment particles).

The polymer-encapsulated pigment particles may be prepared by crosslinking some of the carboxy groups in a carboxy-functional dispersant in the presence of a pigment and a first crosslinking agent, preferably at a temperature of less than 100° C. and/or a pH of at least 6. Such crosslinking is usually performed in an aqueous medium, for example in a mixture comprising water and organic solvent. Suitable mixtures comprising water and organic solvent are as described above in relation to the ink.

Preferably, the polymer-encapsulated pigment particles have a Z-average particle size of less than 500 nm, more preferably from 10 to 400 nm and especially from 15 to 300 nm.

The Z-average particle size may be measured by any means, but a preferred method is by photo correlation spectroscopy devices available from Malvern™ or Coulter™.

The pigment present in the polymer-encapsulated pigment particles may be any coloured inorganic or organic particulates which can provide colour to an ink.

The pigment may be any coloured, particulate material which would be insoluble in the liquid medium without the assistance of the aforementioned polymer, for example an organic or an inorganic pigment.

Preferred pigments are carbon black and organic pigments, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although often regarded as being inorganic, behaves more like an organic pigment in its dispersing properties and is suitable. Preferred organic pigments are phthalocyanines, especially copper phthalocyanine pigments, azo pigments, indanthrones, anthanthrones, quinacridones and carbon black pigments.

The pigment is preferably a cyan, magenta, yellow or black pigment. The pigment may be a single chemical species or a mixture comprising two or more chemical species (e.g. a mixture comprising two or more different pigments). In other words, two or more different pigments solids may be used in the process of the present invention.

Suitable methods for making the polymer-encapsulated pigment particles are analogous to those described in WO 2006/064193. In essence, a dispersant having carboxy groups is adsorbed onto a pigment and then some (but not all) of the carboxy groups are crosslinked to give a pigment dispersion where the pigment is permanently trapped within the crosslinked dispersant. Such particles may be obtained commercially from FUJIFILM Imaging Colorants Limited or its sister company in the USA.

The dispersant, prior to crosslinking with the first crosslinking agent, preferably has two or more and especially ten or more carboxylic acid groups per molecule.

When the first crosslinking agent has two epoxy groups it is preferred that the dispersant has ten or more carboxylic acid groups.

The carboxylic acid group(s) may be present in the dispersant in the form of a free acid (—COOH) or in the form of a salt. The salt may be, for example, a metal ion, an ammonium, substituted ammonium, quaternary ammonium and/or pyridinium salt.

Preferably the dispersant comprises and more preferably is a polyurethane, polyester or more preferably a polyvinyl dispersant. The dispersant may be a combination of polymers which may be physically blended or chemically bonded together (e.g. grafted).

The carboxylic acid group(s) are preferably incorporated into the polymeric dispersant by means of copolymerising a monomer containing at least one carboxylic acid group. Preferred polyvinyl dispersants comprise at least one monomer residue from itaconic acid, maleic acid, fumaric acid, crotonic acid, more preferably methacrylic acid, acrylic acid and beta carboxy ethyl acrylate.

In the case of polyurethanes, the preferred method of incorporating carboxylic acid groups is by copolymerising a diol having a hindered carboxylic acid group. A preferred example of such a diol is dimethylol propanoic acid.

Polyesters having at least one carboxylic acid group can be prepared by reacting a diol monomer with an excess of a dicarboxylic acid monomer. Carboxylic acid group(s) can also be incorporated by copolymerising a diol having a hindered carboxylic acid group (as mentioned above) with a dicarboxylic acid monomer.

The function of the carboxylic acid group(s) in the dispersant is primarily to cross-link with the first crosslinking agent and to provide the subsequent polymer-encapsulated pigment particles with the ability to disperse in aqueous ink media and then be rendered less dispersible by reaction with a second crosslinking agent. Where carboxylic acid group(s) are the only groups for stabilising the polymer-encapsulated pigment particles in the aqueous medium it is preferable to have a molar excess of carboxylic acid groups to epoxy groups to ensure that unreacted carboxylic acid groups remain after the first crosslinking reaction has been completed. In one embodiment the ratio of moles of carboxylic acid groups to moles of, for example, epoxy groups in the first crosslinking agent is preferably from 10:1 to 1.1:1, more preferably from 5:1 to 1.1:1 and especially preferably from 3:1 to 1.1:1

The dispersant may optionally have other stabilising groups. The choice of the stabilising groups as well as the amounts of such groups will depend to a large extent on the nature of the aqueous medium.

Preferred dispersants are derived from both hydrophilic and hydrophobic monomers.

Hydrophilic monomers are those monomers comprising hydrophilic groups which may be ionic or non-ionic groups. The ionic groups may be cationic but are preferably anionic. Both cationic and anionic groups may be present in the dispersant to give amphoteric stabilisation. Preferred anionic groups are phenoxy, sulphonic acid, sulphuric acid, phosphonic, polyphosphoric and phosphoric acid groups which may be in the free acid or salt form as hereinbefore described. Preferred cationic groups are quaternary ammonium, benzalkonium, guanidine, biguanidine and pyridinium. These can be in the form of a salt such as a hydroxide, sulphate, nitrate, chloride, bromide, iodide and fluoride. Preferred non-ionic groups are glucoside, saccharide, pyrrolidone, acrylamide and especially hydroxy groups and poly(akyleneoxide) groups, more preferably poly(ethyleneoxide) or poly(propyleneoxide) groups, especially groups of the formula —$(CH_2CH_2O)_nH$ or —$(CH_2CH_2O)_nC_{1-4}$-alkyl wherein n is from 3 to 200 (preferably 4 to 20). The dispersant can contain a single non-ionic group, several non-ionic groups throughout the dispersant or one or more polymeric chains containing non-ionic groups. Hydroxy groups can be incorporated using polymeric chains such as polyvinylalcohol, polyhydroxyl functional acrylics and celluloses. Ethyleneoxy groups can be incorporated using polymeric chains such as polyethyleneoxide.

Hydrophobic monomers are those monomers comprising hydrophobic groups.

Preferred hydrophobic groups are predominantly hydrocarbons, fluorocarbons, poly $C_{3-4}$-alkyleneoxy and alkyl siloxanes comprising less than three and more preferably no hydrophilic groups. The hydrophobic group is preferably a $C_3$-$C_{50}$ chain or propyleneoxide which can be pendant or in chain with the hydrophobic monomer.

In the case of a polymeric dispersant this may be a homopolymer, but is more preferably a copolymer.

The dispersant preferably comprises random polymers (having statistically short blocks or segments) but can comprise block or graft polymers (having longer blocks or segments). Polymeric dispersants may also comprise alternating polymers. The polymeric dispersants can be branched or star but are preferably linear. The polymeric dispersants may have two or more segments (e.g. block and graft copolymers) but are preferably random.

In embodiments where the polymeric dispersant has two or more segments it is preferred that at least one segment is hydrophobic and at least one segment is hydrophilic relative to each other. A preferred method for making hydrophilic and hydrophobic segments is by the copolymerisation of hydrophilic and hydrophobic monomers respectively. Where the dispersant has at least one hydrophilic and at least one hydrophobic segment the carboxylic acid group(s) can be situated in the hydrophobic segment, in the hydrophilic segment or in both.

Polyvinyl dispersants may be made by any suitable means. A preferred method for making polyvinyl dispersants is free radical polymerisation of vinyl monomers, especially (meth)acrylates and vinyl monomer containing aromatic groups such as vinyl naphthalene and especially styrenic monomers. Suitable free radical polymerisation methods include but are not limited to suspension, solution, dispersion and preferably emulsion polymerisation. Preferably, the vinyl polymerisation is carried out in a liquid composition comprising water.

Preferred polyvinyl dispersant comprise the residues from one or more (meth)acrylate monomers.

Preferably the polyvinyl dispersant is a copolymer.

Copolyvinyl dispersants which contain the residue of both hydrophilic and hydrophobic monomers are preferably substantially free from segments. Copolyvinyl dispersants can be made, for example, by free radical copolymerisation methods wherein the segment length is often statistically very short or effectively non-existent. Such are often referred to as "random" polymerisations. Copolyvinyl dispersants having segments can be made by polymerisation methods such as living polymerisations and especially group transfer polymerisation, atom transfer polymerisation, macromonomer polymerisation, graft polymerisation and anionic or cationic polymerisation.

Suitable hydrophilic vinyl monomers include non-ionic and ionic vinyl monomers.

Preferred non-ionic vinyl monomers are those containing saccharide, glucoside, amide, pyrrolidone and especially hydroxy and ethoxy groups.

Preferred examples of non-ionic vinyl monomers include hydroxy ethylacrylate, hydroxy ethyl methacrylate, vinyl pyrrolidone, ethoxylated (meth)acrylates and (meth)acrylamides.

Suitable ionic vinyl monomers may be cationic but are preferably anionic.

Preferred anionic vinyl monomers are those comprising phosphoric acid groups and/or sulphonic acid groups which may be in the free acid form or salts thereof. The types of salts are as described hereinbefore. Preferred examples are styrenesulfonic acid, vinylbenzylsulfonic acid, vinylsulfonic acid, acryloyloxyalkyl sulfonic acids (for example, acryloyloxymethyl sulfonic acid, acryloyloxyethyl sulfonic acid, acryloyloxypropyl sulfonic acid and acryloyloxybutyl sulfonic acid), methacryloyloxymethyl sulfonic acid, methacryloyloxyethyl sulfonic acid, methacryloyloxypropyl sulfonic acid and methacryloyloxybutyl sulfonic acid), 2-acrylamido-2-alkylalkane sulfonic acids (for example, 2-acrylamido-2-methylethanesulfonic acid, 2-acrylamido-2-methylpropanesulfonic acid and 2-acrylamido-2-methylbutane sulfonic acid), 2-methacrylamido-2-alkylalkane sulfonic acids (for example, 2-methacrylamido-2-methylethanesulfonic acid, 2-methacrylamido-2-methylpropanesulfonic acid and 2-methacrylamido-2-methylbutanesulfonic acid), mono-(acryloyloxyalkyl)phosphates (for example, mono(acryloyloxyethyl)phosphate and mono(3-acryloyloxypropyl)phosphates) and mono(methacryloyloxyalkyl)phosphates (for example, mono(methacryloyloxyethyl)phosphate and mono(3-methacryloyloxypropyl)phosphate).

Preferred cationic vinyl monomers are those comprising quaternary amine, pyridine, guanidine and biguanidine groups.

Preferred hydrophobic vinyl monomers have no hydrophilic groups. Preferred hydrophobic vinyl monomers include $C_{1-20}$-hydrocarbyl(meth)acrylates, butadiene, styrene and vinyl naphthalene. Especially preferred are $C_{4-20}$-hydrocarbyl(meth)acrylates for example butyl(meth)acrylate, octyl(meth)acrylate, 2-ethyl hexyl(meth)acrylate, isobornyl acrylate, lauryl acrylate and stearyl acrylate. A particularly preferred hydrophobic vinyl monomer is 2-ethyl hexyl methacrylate. The hydrocarbyl groups in these hydrophobic vinyl monomers may be branched but are preferably linear.

Polyesters are typically made by esterification of a dicarboxylic acid with a diol. In place of the carboxylic acid an acid chloride, anhydride or alky (typically methyl or ethyl) ester of the acid can be used. Small amounts of monofunctional and/or tri or higher functional monomers can be used. Mixtures of carboxylic acids and/or alcohols can be used. Another route to the preparation of polyesters is the well known ring opening of cyclic lactones such as caprolactone. Caprolactone can be polymerised to give diols which may be used in both polyester or polyurethane synthesis.

Preferred hydrophobic monomers for making polyesters are esters, acids, acid chlorides anhydrides, cyclic lactones and alcohols containing $C_{1-50}$-hydrocarbylene more preferably $C_{4-50}$-hydrocarbylene, and especially $C_{6-20}$-hydrocarbylene residues. These hydrocarbylene residues preferably comprise alkylene, cycloalkylene, arylene, aralkylene and/or alkarylene residues. Hydrophobic monomers preferably contain no hydrophilic groups other than those needed for the polyester polymerisation. Other preferred hydrophobic monomers include those containing $C_{3-4}$-alkyleneoxy (especially propyleneoxy), fluorocarbons and siloxanes. Hydrophobic urethanes, polycarbonates and polyvinyls can be prepared with carboxylic acid or hydroxy groups such that they may be incorporated into polyesters.

Preferred hydrophilic monomers for making polyesters contain hydroxy groups and/or acid groups which are unreacted, or ethyleneoxy groups. Especially preferred are polyethyleneoxy diols.

Suitable hydrophilic monomers for making polyesters may comprise sulphonic acid with hydroxy and/or carboxylic acid groups, for example aromatic dicarboxylic acids having an ionised sulphonate group. Particularly preferred is sodio-5-sulphoisophthalic acid (SSIPA). Other useful monomers which have two or more groups which readily undergo an ester condensation reaction and have one or more sulphonic acid groups are dihydroxy aryl monomers having at least one sulphonic acid group.

A further method for introducing hydrophilic residues is to incorporate polyester monomers containing protected hydrophilic groups (such as silylated hydroxyl groups) which are de-protected after polymerisation. The advantage of protection/de-protection is that the molecular weight and remaining acid/hydroxy functionality can be separately controlled.

Polyurethanes are preferably made by the condensation of a di-isocyanate with a diol. Small amounts of monofunctional and/or tri or higher functional monomers can be used. Mixtures of isocyanates and/or alcohols can be used.

Preferred hydrophobic monomers for making polyurethanes include isocyanates and alcohols comprising $C_{1-50}$-hydrocarbylene more preferably $C_{4-50}$-hydrocarbylene, and especially $C_{6-20}$-hydrocarbylene residues. Hydrocarbylene residues can comprise alkylene, cycloalkylene, arylene, aralkylene and/or alkarylene residues. Preferably the hydrophobic monomers contain no hydrophilic group other than those needed for the urethane polymerisation. Other preferred hydrophobic monomers for making polyurethanes contain siloxane and fluorocarbon groups. Hydrophobic polycarbonates, polyesters and polyvinyls can be prepared with isocyanate or hydroxy groups such that they can be incorporated into a polyurethane.

Examples of suitable hydrophobic isocyanates include ethylene diisocyanate, 1,6-hexamethylene diisocyanate, isophorone diisocyanate, tetramethylxylene diisocyanate, 1,4-phenylene diisocyanate, 2,4-toluene diisocyanate, 2,6-toluene diisocyanate, 4,4'-diphenyl-methane diisocyanate and its hydrogenated derivative, 2,4'-diphenylmethane diisocyanate and its hydrogenated derivative, and 1,5-naphthylene diisocyanate. Mixtures of the polyisocyanates can be used, particularly isomeric mixtures of the toluene diisocyanates or isomeric mixtures of the diphenylmethane diisocyanates (or their hydrogenated derivatives), and also organic polyisocyanates which have been modified by the introduction of urethane, allophanate, urea, biuret, carbodiimide, uretonimine or isocyanurate residues.

Preferred hydrophobic alcohols contain $C_{3-4}$-alkyleneoxy (especially propyleneoxy), fluorocarbon, siloxane, polycarbonate and $C_{1-20}$-hydrocarbyl poly(meth)acrylate residues.

Preferred examples of hydrophobic diols for making polyurethanes include hexane diol, cyclohexane diol, propyleneoxy diols, diols from polycaprolactone, diols from polyvalerolactone, poly$C_{1-20}$-alkyl(meth)acrylate diols, siloxane diols, fluorocarbon diols and alkoxylated bisphenol A diols.

Preferred hydrophilic monomers for making polyurethanes contain ethyleneoxy, sulphonic acid, phosphoric acid or quaternary ammonium groups. A preferred example of a monomer containing a sulphonic acid group is bis(2-hydroxyethyl)-5-sodiosulphoisophthalate. Preferred examples of such monomers containing quaternary ammonium groups are quaternary ammonium salt diols for example dimethanol diethyl ammonium bromide. The acidic and/or quaternary ammonium group may be in the form of a salt as hereinbefore described. A preferred polyurethane monomer containing an ethyleneoxy groups is polyethyleneoxide diol and especially the polyoxalkyene amines as described in EP 317,258 the teaching of which is incorporated herein.

Hydrophilic residues can be introduced into polyurethanes by using excess hydroxy groups over isocyanate groups so that the resulting hydrophilic polyurethanes have unreacted hydroxy groups after polymerisation. Also, monomers containing protected hydrophilic groups such as silylated hydroxy groups can also be used. Said protected groups can be de-protected after polymerisation.

The dispersant is preferably chosen to suit the liquid medium to be used in the process for preparing the encapsulated particulate solid and also the final aqueous ink vehicle in which the polymer-encapsulated pigment particles will be used.

In embodiments where the first crosslinking agent has one or more oligomeric dispersing group the dispersant preferable has acid value of at least 125 mg KOH/g.

The acid value (AV) of the dispersant, prior to crosslinking with the first crosslinking agent, is preferably from 130 to 320 and more preferably from 135 to 250 mg KOH/g. We have found that dispersants having such acid values provide resultant polymer-encapsulated pigment particles which exhibit good stability in the ink and also have sufficient carboxy groups for subsequent crosslinking in step (b). This stability in aqueous media is especially useful in the demanding liquid vehicles used in ink jet printing, with more difficult to disperse particulate solids and with crosslinking agents which have little and especially no oligomeric dispersing groups.

Preferably, the dispersant (prior to crosslinking) has a number average molecular weight of from 500 to 100,000, more preferably from 1,000 to 50,000 and especially from 1,000 to 35,000. The molecular weight is preferably measured by gel permeation chromatography ("GPC").

The dispersant need not be totally soluble in the liquid medium used to make the polymer-encapsulated pigment particles. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium used to make the polymer-encapsulated pigment particles which do not settle or separate on standing.

It is preferred that the dispersant is substantially soluble in the liquid medium used to make the polymer-encapsulated pigment particles, giving rise to clear or hazy solutions.

Preferred random polymeric dispersants tend to give clear compositions whilst less preferred polymeric dispersants with two or more segments tend to give rise to the aforementioned hazy compositions in liquid media.

Typically the dispersant adsorbs onto the pigment prior to crosslinking so as to form a relatively stable dispersion of the pigment particles. This dispersion is then crosslinked using the first crosslinking agent to form the polymer-encapsulated pigment particles. This pre-adsorption and pre-stabilisation in particular distinguishes the present invention from coacervation approaches whereby a polymer or prepolymer (which is not a dispersant) is mixed with a particulate solid, a liquid medium and the cross-linker and only during or after crosslinking does the resultant cross-linked polymer precipitate onto the particulate solid.

In embodiments where the dispersant has an acid value of at least 125 mg KOH/g the first crosslinking agent may have no oligomeric dispersing groups, but preferably the first crosslinking agent has one or more oligomeric dispersing groups.

The term oligomer as used herein is not limited to any upper molecular weight or to any upper limit regarding the number of repeat units.

Crosslinking agents having one or more oligomeric dispersing group increase the stability of the polymer-encapsulated pigment particles in the ink.

The oligomeric dispersing group preferably is or comprises polyalkyleneoxide, more preferably a poly$C_{2-4}$-alkyleneoxide and especially a polyethyleneoxide. The polyalkyleneoxide groups provide stearic stabilisation which improves the stability of the resulting encapsulated particulate solid.

Preferably the polyalkyeneoxide contains from 3 to 200, more preferably from 5 to 50 alkyleneoxide and especially from 5 to 20 alkyleneoxide repeat units.

The first crosslinking agent preferably has at least two epoxy groups.

Preferred crosslinking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred crosslinking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred crosslinking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polyglycide ether.

The first crosslinking agent preferably has one or more ethylene glycol groups to help disperse the crosslinking agent and the resultant particles.

The first crosslinking agent may be a single crosslinking agent or a combination of two or more crosslinking agents. When more than one crosslinking agent is used these may have the same or different numbers of epoxy groups.

The first and second crosslinking agents may be the same as each other or different.

It is preferred that the only crosslinking groups present in the first crosslinking agent are epoxy groups.

The ink jet printer preferably applies the ink to the substrate in the form of droplets that are ejected through nozzles onto the substrate without the nozzles coming into contact with the substrate.

Preferred ink jet printers are piezoelectric ink jet printers and thermal ink jet printers. In thermal ink jet printers, programmed pulses of heat are applied to the ink in a reservoir by means of a resistor adjacent to the orifice, thereby causing the ink to be ejected from the orifice in the form of small droplets directed towards the substrate during relative movement between the substrate and the orifice. In piezoelectric ink jet printers the oscillation of a small crystal causes ejection of the ink from the orifice. Alternately the ink can be ejected by an electromechanical actuator connected to a movable paddle or plunger, for example as described in International Patent Application WO00/48938 and International Patent Application WO00/55089.

The substrate is preferably a paper, a textile, metal or glass, more preferably a polymeric substrate. Examples of polymeric substrates include plastic containers (e.g. shampoo bottles) and overhead projector slides.

The process of the present invention may provide particular value for the printing of polymeric substrates that may come into contact with rubbing or moisture, where the resultant prints derived from a crosslinked polymer show good adhesion, rub fastness and wet fastness combined with good light fastness.

Thus in one embodiment the polymer-encapsulated pigment particles used in step (a) have been obtained by a process comprising crosslinking a dispersant with a first crosslinking agent in the presence of a pigment and a liquid medium, thereby encapsulating the pigment within the cross-linked dispersant, wherein:
a) the dispersant has at least one carboxylic acid group;
b) the first crosslinking agent has at least two epoxy groups and one or more ethylene glycol groups; and
c) the crosslinking reaction between the carboxylic acid and epoxy groups is performed at a temperature of less than 100° C. and/or a pH of at least 6.

In a further embodiment the first crosslinking agent has one or more oligomeric dispersing group and the dispersant has an acid value of at least 125 mg KOH/g.

The combined effects from both the oligomeric dispersing groups in the first crosslinking agent and the dispersant having an acid value of at least 125 mg KOH/g provides encapsulated particulate solids with excellent stability in aqueous vehicles.

The crosslinking in step (b) is primarily intended to create a robust polymer network on the substrate, having good fastness properties, good adhesion to the substrate and good rub resistance.

The crosslinking in step (b) may be achieved in a number of ways. For example, the ink used in step (a) may include within it a crosslinking agent (referred to as the second crosslinking agent in order to avoid confusion with the crosslinking used to form the particles incorporated into the ink) and the crosslinking may be triggered in step (b), e.g. by heat, by a change in pH, by evaporation of the aqueous medium, by the chemical nature of the substrate (e.g. salt or pH), by application of a chemical triggering agent which increases the reactivity of the second crosslinking agent (e.g. an acid or base which increases reactivity of the crosslinking agent). The application of a chemical triggering agent and the crosslinking agent in step (b) may be done in either order or both at the same time, preferably both by means of an ink jet printer.

In an alternative embodiment, the ink used in step (a) is free from crosslinking agents. The first contact between the ink and the second crosslinking agent may be in flight as they are jetted from different nozzles onto the substrate, or alternatively the first contact between the ink and the second crosslinking agent may be on the substrate. The ink and a second crosslinking agent may be applied separately to the substrate, for example through different nozzles. This embodiment is preferred because it ensures the polymer-encapsulated pigment particles do not prematurely react with the second crosslinking agent e.g. during storage, reducing the chances of nozzle blockage and loss of colour from the ink over time. Also some crosslinking agents are sensitive to water and would rapidly degrade if included in the aqueous ink. By keeping the second crosslinking agent separate from the ink until use one may use an aqueous liquid medium for the ink and a non-aqueous liquid vehicle for the second crosslinker. In this embodiment the ink and the second crosslinking agent may be applied to the substrate (e.g. through different nozzles to avoid premature reaction) in either order or both at the same time, preferably both by means of an ink jet printer.

If desired the ink may contain a second crosslinking agent and another second crosslinking agent (which may be the same or different) is applied separately to the substrate, for example through different nozzles from the nozzles used to apply the ink.

Preferably the polymer-encapsulated pigment particles are reacted with the second crosslinking agent within 5 seconds, more preferably within 3 seconds, especially within 1 second of the ink contacting the substrate. Thus when the ink and the second crosslinking agent are applied separately to the substrate, they may come into contact before, during or after the ink contacts the substrate, preferably within the aforementioned 5, 3 or 1 second of the ink contacting the substrate.

Thus in one embodiment the process comprises the further step of applying a pigment-free formulation comprising the second crosslinking agent to substrate such that the polymer-encapsulated pigment particles react therewith, thereby forming a water-resistant image on the substrate.

The pigment-free formulation preferably comprises the second crosslinking agent and a liquid medium, for example an aqueous medium or a non-aqueous medium. Preferred aqueous media are as described in relation to the ink. Preferred non-aqueous liquid media are miscible with the ink. Of course the liquid medium used in the pigment-free formulation may be the same as or different to the liquid medium used in the ink.

Preferably the pigment-free formulation comprises:
(a) from 0.1 to 15 parts of the second crosslinker; and
(b) from 85 to 99.9 parts of liquid medium;
wherein all parts are by weight.

In this pigment-free formulation, the number of parts of (a)+(b)=100. The number of parts of component (a) is preferably from 0.2 to 12, more preferably from 0.5 to 9, and especially from 1 to 5 parts. The number of parts of component (b) is preferably from 88 to 99.9, more preferably from 91 to 99.5 and especially from 95 to 99 parts.

In one embodiment step (b) comprises heating the printed substrate, e.g. at a temperature from 25° C. to 90° C. and more preferably from 35° C. to 80° C.

In another embodiment step (b) comprises changing the pH of the ink (preferably by at least 0.5, more preferably by at least 1 pH unit). Such a pH change can be a useful way to dramatically increase reactivity of the second crosslinking agent.

The pH for the crosslinking reaction in step (b) is preferably from 3 to 14, more preferably from 3.5 to 11 and especially preferably from 4 to 9.

The function of the crosslinking agent used in step (b) is quite different from that used to prepare the polymer-encapsulated pigment particles. The crosslinking used to prepare the polymer-encapsulated pigment particles is intended to create particles which are water-dispersible (for formulation into an aqueous ink), e.g. due to the presence of carboxy groups. In contrast, the crosslinking in step (b) is intended to produce a polymer which has low or no water solubility through crosslinking carboxy groups which were present in the original polymer-encapsulated pigment particles.

Hence the second crosslinking agent will usually be different from the first crosslinking agent, e.g. whereas it is desirable for the first crosslinking agent to have water-dispersing groups, the second crosslinking agent is preferably free from water-dispersing groups. Also while it is preferred for the first crosslinking agent to have two (and no more than two) crosslinking groups, the second crosslink agent preferably has more than two crosslinking groups (so that a three dimensional crosslinked network with low water solubility results).

Also the molar ratio of crosslinking agent to carboxy groups used in step (b) is preferably higher than the ratio used to prepare the polymer-encapsulated pigment particles. This is because one will not wish to use up all of the carboxy groups in the dispersant because these groups are used to render the polymer-encapsulated pigment particles dispersible in the ink. However in step (b) the intention is, opposite, one wishes to dramatically reduce the number of carboxy groups so that the product of step (b) has low or no water-solubility.

The amount of second crosslinking agent applied to the substrate preferably exceeds the amount required to react with all carboxy groups present on the polymer-encapsulated pigment particles. For example, the amount of crosslinking agent applied to the substrate is preferably from 1.1 to 5, more preferably 1.2 to 3, especially 1.2 to 2.5 times the amount required to react with all carboxy groups present on the polymer-encapsulated pigment particles. The amount of crosslinking agent required to react with all carboxy groups can be calculated from the number of reactive groups in the crosslinking agent and the acid value of the polymer-encapsulated pigment particles.

Examples of suitable second crosslinking agents include compounds having two or more groups selected from epoxy, oxetane, carbodiimide, hydrazide, oxazoline, aziridine, isocyanate, N-methylol, keteneimine and isocyanurate. Multivalent metals (e.g. multivalent Al, Pb, Mn, Cd, Cu, Ti, Zr, Al, Hf or Cr) might also prove useful, although organic crosslinking agents are preferred because these crosslink by the formation of permanent covalent bonds instead of ionic charges.

In one embodiment the second crosslinking agent is free from cationic groups.

Examples of suitable epoxy crosslinking agents for use in step (b) are described above, especially those which have zero oligomeric dispersing groups.

Examples of oxetane crosslinking agents include 1,4-bis[(3-ethyl-3-oxetanylmethoxymethyl)]benzene (BEOB), 4,4'-bis[(3-ethyl-3-oxetanyl)methoxy]benzene (4,4'-BEOBP), 1,4-bis[(3-ethy-3-oxetanyl)methoxyl-benzene (1,4-BEOMB), 1,2-bis[(3-ethyl-3-oxetanyl)-methoxy]benzene (1,2-BEOMB), 4,4-bis[(3-ethyl-3-oxetanyl)methoxy]biphenyl (4,4'-BEOMB) and 3,3',5,5'-tetramethyl-[4,4'-bis(3-ethyl-3-oxetanyl)methoxy]biphenyl (TM-BEOBP).

Examples of carbodiimide crosslinking agents include crosslinker CX-300 from DSM NeoResins. Carbodiimide crosslinking agents having good solubility or dispersibility in water may also be prepared as described in U.S. Pat. No. 6,124,398, synthetic Examples 1 to 93.

Examples of isocyanate crosslinking agents include isophorone diisocyanate, hexamethylene diisocyanate, toluene diisocyanate, methylene diphenyl diisocyanate, methylene dicyclohexyl diisocyante, 2-methyl-1,5-pentane diisocyanate, 2,2,4-trimethyl-1,6-hexane diisocyante and 1,12-dodecane diisocyanate, 1,11-diisocyanatoundecane, 1,12-diisocyanatododecane, 2,2,4- and 2,4,4-trimethyl-1,6-diisocyanatohexane, 1,3-diisocyanatocyclobutane, 4,4'-bis-(isocyanatocyclohexyl)-methane, hexamethylene diisocyanate, 1,2-bis-(isocyanatomethyl)-cyclobutane, 1,3- and 1,4-bis-(isocyanatomethyl)cyclohexane, hexahydro-2,4- and/or -2,6-diisocyanatoluene, 1-isocyanato-2-isocyanatomethyl cyclopentane, 1-isocyanato-3-isocyanatomethyl-3,5,5-trimethyl-cyclohexane, 2,4'-dicyclohexylmethane diisocyanate, and 1-isocyanato-4(3)-isocyanatomethyl-1-methyl cyclohexane, tetramethyl-1,3- and/or -1,4-xylylene diisocyanate, 1,3- and/or 1,4-phenylene diisocyanate, 2,4- and/or 2,6-toluene diisocyanate, 2,4- and/or 4,4'-diphenyl-methane diisocyanate, 1,5-diisocyanatonaphthalene, and p-xylylene diisocyanate. Suitable diisocyanates are also understood to include those containing modification groups such as biuret, uretdione, isocyanurate, allophanate and/or carbodiimide groups, as long as they contain two or more isocyanate groups. For isocyanates the liquid medium is preferably non-aqueous, although water can sometimes be tolerated with blocked isocyanates.

In a preferred embodiment, the polyisocyanate compound contains three isocyanate groups. A convenient source of triisocyanate functional compounds is the known isocyanurate derivative of diisocyanates. Isocyanurate derivatives of diisocyanates can be made by reacting the diisocyanate together with a suitable trimerization catalyst. An isocyanurate derivative is produced that contains an isocyanurate core with pendant organic chains terminated by three isocyanate groups. Several isocyanurate derivatives of diisocyanates are commercially available. In one preferred embodiment, the isocyanurate used is the isocyanurate of isophorone diisocyanate. In another preferred embodiment, the isocyanaurate of hexamethylene diisocyanate is used.

Examples of N-methyol crosslinking agents include dimethoxydihydroxy ethylene urea; N,N-dimethylol ethyl carbamate; tetramethylol acetylene diurea; dimethylol urone; dimethylol ethylene urea; dimethylol propylene urea; dimethylol adipic amide; and mixtures comprising two or more thereof.

Examples of keteneimine crosslinking agents include compounds of formula $Ph_2C=C=N-C_6H_4-N=C=CPh_2$ wherein each Ph independently is an optionally substituted phenyl group.

Examples of hydrazide crosslinking agents include malonic dihydrazide, ethylmalonic dihydrazide, succinic dihydrazide, glutaric dihydrazide, adipic dihydrazide, isophthalic dihydrazide, oxalyl dihydrazide and pimelic dihydrazide.

Commercially available highly reactive oxazoline crosslinking agents are available from, for example, Nippon Shokubai under the Epocross™ trade mark. These include the emulsion type (e.g. the Epocross™ K-2000 Series, such as K-2010E, K-2020E and K-2030E) and the water-soluble types (e.g. the Epocross™ WS Series, such as WS-300, WS-500 and WS-700).

Examples of aziridine crosslinking agents include ethylene imine-based polyaziridines (e.g. PZ-28 and PZ-33 available from PolyAziridine LLC, Medford, N.J.); XC-103 tri-functional aziridines, XC-105 polyfunctional aziridines and Crosslinker XC-113 (available from SHANGHAI ZEALCHEM CO., LTD., China); polyfunctional aziridine liquid crosslinker SaC-100 (available from Shanghai UN Chemical Co., Ltd, China); The aziridines crosslinking agents disclosed in WO 2009/120420; NeoCryl® CX-100 (available from DSM NeoResins); Xama™ polyfunctional aziridines (available from Lubrizol); trimethylolpropane tris(beta-aziridino) propionate, neopentylglycol di(beta-aziridino)propionate, glyceryl tris(beta-aziridino)propionate, pentaerythrityltetra (beta-aziridino)propionate, 4,4'-isopropylidenediphenol di(beta-aziridino)propionate, 4,4'-methylenediphenol di(beta-aziridino); and mixtures comprising two or more thereof.

According to a second aspect of the present invention there is provided an ink jet printer cartridge (and an ink jet printer) comprising:
(a) a first chamber and an ink as defined in relation to the first aspect of the present invention, wherein said ink is present in the first chamber; and
(b) a second chamber comprising a pigment-free formulation comprising a crosslinking agent and an aqueous medium.

The ink and the pigment-free formulation are preferably as described above in relation to the first aspect of the present invention. The identity of the substrate is not particularly critical. Examples include paper, polyester acrylic film, polyurethane, bakelite, poly vinyl chloride, nylon, polymethyl methacrylate, polyethylene terephthalate, polypropylene, polyethylene terephthalate glycol, acrylonitrile-butadiene-styrene, polycarbonate, a blend of about 50% polycarbonate and about 50% acryloni-trile-butadiene-styrene, polybutylene terephthalate, rubber, glass, ceramic and metal. If desired the substrate may be pre-treated in order to enhance adhesion of the ink thereto. For example the substrate may be roughened, or it may be coated with an ink receptive coating.

Preferred ink receptive coatings, especially for non-porous substrates, comprise a hydrophilic polymer and a hydrophobic polymer.

Suitable formulations for providing the ink receptive coating include water-based mixtures of polyvinyl alcohol and polyacrylic acid, together with a water-based emulsion containing a hydrophobic polymer in the internal phase and stabilized at a pH of 7 or less. Examples of suitable hydrophobic water-based emulsions are acrylic type materials such as Flexobond 325 (a vinyl-acrylic copolymer-pH of 4 to 5), Walpol 40-136 a vinyl-acrylic copolymer-pH 5.0, and Flexobond 381 (a vinyl acrylic pH 4-6).

The ink receptive coating can also contain titanium dioxide or a mixture of white or opaqueing pigments dispersed therein, and fillers such as silicas and clays as are well known in the art.

The ink receptive coatings can be deposited on a substrate (especially a non-porous substrate) and then dried before printing, e.g. with warm air, and give a solid ink receptive films. Deposition may be by spraying or by any other suitable means of coating.

Preferably the printer further comprises a means for heating a substrate to which the ink and the pigment-free formulation have been applied. This heating can be very useful for assisting the crosslinking reaction and also drying the ink.

The invention is further illustrated by the following Examples in which all parts and percentages are by weight unless otherwise stated.

EXAMPLES

Preparation of Pigment-Free Crosslinker Formulations

Pigment-free formulations comprising a second crosslinking agent may be prepared as indicated in Table 1:

TABLE 1

| Crosslinker Formulation | Crosslinker (parts) | Liquid vehicle (parts) |
|---|---|---|
| F1 | Glycerol polyglycidyl ether (3) | Water:diethylene glycol (85:15) |
| F2 | trimethylolpropane polygycidyl ether (2.3) | Water:ethylene glycol:Surfynol ™ 465 (84:15:1) |

TABLE 1-continued

| Crosslinker Formulation | Crosslinker (parts) | Liquid vehicle (parts) |
|---|---|---|
| F3 | BEOB (5) | Water:N-methyl pyrollidone ("NMP") (85:15), buffered to pH 6.5 |
| F4 | 1,2-BEOMB (1) | Water:diethylene glycol (84:16) |
| F5 | CX-300 (2.1) | Water:diethylene glycol (70:30) |
| F6 | N,N'-Diisopropyl carbodiimide (4.3) | Water:ethylene glycol (80:20) |
| F7 | isophorone diisocyanate (7) | Sulpholane (100) |
| F8 | hexamethylene diisocyanate (4) | NMP (100) |
| F9 | isocyanurate of isophorone diisocyanate (2.9) | Water:diethylene glycol:NMP (71:9:20) |
| F10 | malonic dihydrazide (10) | Water:diethylene glycol:NMP (80:5:5) |
| F11 | succinic dihydrazide (1.9) | Water:diethylene glycol:NMP (80:4:6) |
| F12 | Epocross™ K-2010E (3.7) | Water:diethylene glycol:NMP (70:10:20) |
| F13 | Epocross™ WS-300 (3.3) | Water:diethylene glycol:NMP (90:10) |
| F14 | PZ-28 (2.8) | Water:diethylene glycol:NMP (80:4:6) |
| F15 | NeoCryl® CX-100 (2.9) | Water:diethylene glycol:NMP (91:9) |

(the identity and commercial source of BEOB, 1,2-BEOMB, CX-300, Epocross™ products, PZ-28 and NeoCryl® CX-100 are as indicated earlier in this specification)

Preparation of Inks

The following inks comprising polymer-encapsulated pigment particles may be prepared by mixing the stated ingredients in the amounts indicated in Table 2. "Ex" refers to the encapsulated particulate solid dispersion of the same number disclosed in WO 2006/064193, for example Ex 2 refers to encapsulated particulate solid dispersion number 2 disclosed in WO 2006/064193, page 20, Table 5, second row. The number of parts of the polymer-encapsulated pigment particles is on a 100% solids basis (e.g. if a dispersion has 20% solids content 3 parts in Table 2 equates to 15 parts of the dispersion). The surfactant is Surfynol™ 465:

TABLE 2

| Ink | Polymer-encapsulated pigment particles (parts) | Aqueous vehicle (parts) |
|---|---|---|
| Ink 1 | Ex 1 (6) | 2-pyrollidinone:ethylene glycol:surfactant:water (5:14:1:80) |
| Ink 2 | Ex 2 (4.5) | 2- pyrollidinone:butyl cellusolve:butyl carbitol:surfactant:water (5:10.5:16:1:65) |
| Ink 3 | Ex 3 (2.9) | 2-pyrollidinone:butyl cellusolve:butyl carbitol:surfactant:water (5.1:10:16:1:65) |
| Ink 4 | Ex 4 (1) | 2-pyrollidinone:butyl cellusolve:butyl carbitol:surfactant:water (5:12:16:1:65) |
| Ink 5 | Ex 5 (5.1) | 2-pyrollidinone:butyl cellusolve:butyl carbitol:surfactant:water (5:10:15.9:1:65) |
| Ink 6 | Ex 6 (2.7) | 2-pyrollidinone:butyl cellusolve:butyl carbitol:surfactant:water (5.3:10:16:1:65) |
| Ink 7 | Ex 7 (2.6) | 2-pyrollidinone:butyl cellusolve:butyl carbitol:water (5:10:16:65.4) |
| Ink 8 | Ex 8 (3.2) | 2-pyrollidinone:butyl cellusolve:butyl carbitol:surfactant:water (5:9.8:16:1:65) |
| Ink 9 | Ex 9 (5.5) | 2-pyrollidinone:butyl cellusolve:butyl carbitol:PZ-28:surfactant:water (6.1:10:14.5:1.5:65) |
| Ink 10 | Ex 1 (0.5) | ethylene glycol phenyl ether:gamma.-butyrolactone:methyl ethyl ketone:water (5:5:77:10:3) |

Printing Process

Using the combinations indicated in Table 3 below, Inks 1 to 9 and formulations F1 to F15 may be loaded into separate empty chambers of an ink jet printer cartridge and loaded into a piezo ink jet printer from Epson. The inks and formulations may be fired onto a substrate such that the ink and formulation overlap. The resultant print may then be heated to 60-70° C. if so desired, e.g. using an infrared light source or hot air blower.

TABLE 3

| Example | Ink | Crosslinker Formulation | Substrate |
|---|---|---|---|
| 1 | Ink 1 | F1 | Paper |
| 2 | Ink 2 | F2 | Polyester |
| 3 | Ink 3 | F3 | Acrylic film |
| 4 | Ink 4 | F4 | Polyurethane |
| 5 | Ink 5 | F5 | Bakelite |
| 6 | Ink 6 | F6 | Poly vinyl chloride |
| 7 | Ink 7 | F7 | Nylon |
| 8 | Ink 8 | F8 | Polymethyl methacrylate |
| 9 | Ink 9 | F9 | Polyethylene terephthalate |
| 10 | Ink 3 | F10 | Polypropylene |
| 11 | Ink 2 | F11 | Rubber |
| 12 | Ink 9 | F12 | Paper |
| 13 | Ink 9 | F13 | Polyester |
| 14 | Ink 9 | F14 | Acrylic film |
| 15 | Ink 9 | F15 | Polyurethane |

Examples 16 to 30

Three substrates PE1 to PE3 comprising a non-porous support and an ink receptive coating may be prepared as follows:

PE 1

A composition comprising the following ingredients are ball-milled for 2 hours and then wire rod coated on clear 175-micron polyester.

| Ingredient | Amount (parts) |
|---|---|
| 12% solution of polyvinyl alcohol in water | 2 |
| 35% solution of polyacrylic acid in water | 5 |
| BYK™ 346 | 0.3 |
| Walpol™ 40-136 | 5 |
| Ethanol | 6.3 |
| Kronos™ 2065 | 5.6 |
| Water | 14.3 |

The coated polyester is dried at 112° C. for 2 minutes to give a dry weight of 10 grams per square meter.

PE2

A composition comprising the following ingredients are ball-milled for 2 hours to disperse and then wire rod coated on clear 175-micron transparent polyester.

| Ingredient | Amount (parts) |
|---|---|
| Klucel™ E | 1.26 |
| Polyacrylic acid | 6.79 |
| BYK™ 346 | 1.88 |
| Setalux™ 17-1745 | 13.7 |
| Kronos™ 2065 | 15.96 |
| Ethanol | 55.28 |
| Ethyl Acetate | 5.13 |

The coated polyester is dried at 80° C. for 5 minutes to give a dry weight of 9.5 grams per square meter.

PE3

A composition comprising the following ingredients are ball-milled for 2 hours to disperse and then wire rod coated on clear 175-micron transparent polyester.

| Ingredient | Amount (parts) |
| --- | --- |
| Klucel ™ E | 1.5 |
| Polyacrylic acid | 7.93 |
| BYK ™ 346 | 2.27 |
| Setalux ™ 17-1354 | 15.9 |
| Ethyl acetate | 6.07 |
| Ethanol | 66.32 |

The coated polyester is dried at 105° C. for 2 minutes to give a dry weight of 2.34 grams per square meter.

Sources of Raw Materials:

Walpol™ 40-136 from Reichold Inc., Research Triangle Park, N.C. USA.

Setalux™ products from Akzo Nobel, Maastricht, The Netherlands.

BYK™ 346 from BYK-Chemie GmbH, Postfach, 100245, Wesel, Germany.

Kronos™ 2065 from Kronos Inc. Huston, Tex., USA

Klucel™ E-Hercules Inc. Wilmington. Del., USA.

Printing Process

Using the combinations indicated in Table 4 below, Inks 1 to 9 and formulations F1 to F15 may be loaded into separate empty chambers of an ink jet printer cartridge and loaded into a piezo ink jet printer from Epson. The inks and formulations may be fired onto a substrate such that the ink and formulation overlap. The resultant print may then be heated to 60-70° C. if so desired, e.g. using an infrared light source or hot air blower.

TABLE 4

| Example | Ink | Crosslinker Formulation | Substrate |
| --- | --- | --- | --- |
| 16 | Ink 1 | F1 | PE1 |
| 17 | Ink 2 | F2 | PE2 |
| 18 | Ink 3 | F3 | PE3 |
| 19 | Ink 4 | F4 | PE1 |
| 20 | Ink 5 | F5 | PE2 |
| 21 | Ink 6 | F6 | PE3 |
| 22 | Ink 7 | F7 | PE1 |
| 23 | Ink 8 | F8 | PE2 |
| 24 | Ink 9 | F9 | PE3 |
| 25 | Ink 1 | F10 | PE1 |
| 26 | Ink 2 | F11 | PE2 |
| 27 | Ink 3 | F1 | PE3 |
| 28 | Ink 4 | F13 | PE1 |
| 29 | Ink 5 | F2 | PE2 |
| 30 | Ink 6 | F5 | PE3 |

The invention claimed is:

1. A process for printing an image on a substrate comprising the steps of:
   (a) applying an ink comprising polymer-encapsulated pigment particles and an aqueous medium to a substrate by means of an ink jet printer, wherein
      (i) the said particles are dispersed in the aqueous medium, and
      (ii) the said particles comprise a carboxy-functional dispersant crosslinked around a pigment core by a first crosslinking agent; and
   (b) crosslinking the polymer-encapsulated pigment particles with a second crosslinking agent, wherein the second crosslinking agent crosslinks the polymer-encapsulated pigment particles by the formation of permanent covalent bonds between the crosslinking agent and the polymer-encapsulated pigment particles.

2. The process according to claim 1 wherein the first crosslinking agent has at least two epoxy groups.

3. The process according to claim 2 wherein the dispersant, prior to crosslinking, has an acid value of from 135 to 250 mg KOH/g.

4. The process according to claim 1 wherein the ink further comprises the second crosslinking agent.

5. The process according to claim 4 wherein the second crosslinking agent has two or more groups selected from the group consisting of epoxy, oxetane, carbodiimide, hydrazide, oxazoline, aziridine, isocyanate, N-methylol, keteneimine and isocyanurate groups.

6. The process according to claim 1 wherein the first contact between the ink and the second crosslinking agent is (a) in flight as they are jetted from different nozzles onto the substrate; or (b) on the substrate.

7. The process according to claim 1 wherein the crosslinking in step (b) is triggered by heat, by a change in pH, by evaporation of the aqueous medium, by the chemical nature of the substrate or by application of a chemical triggering agent which increases the reactivity of the second crosslinking agent.

8. The process according to claim 7 wherein the second crosslinking agent has two or more groups selected from the group consisting of epoxy, oxetane, carbodiimide, hydrazide, oxazoline, aziridine, isocyanate, N-methylol, keteneimine and isocyanurate groups.

9. The process according to claim 6 wherein the amount of crosslinking agent applied to the substrate exceeds the amount required to react with all carboxy groups present on the polymer-encapsulated pigment particles.

10. The process according to claim 1 which further comprises the step of heating the printed substrate.

11. The process according to claim 1 wherein the first crosslinking agent comprises a water-dispersing group and the second crosslinking agent is free from water-dispersing groups.

12. The process according to claim 1 wherein the second crosslinking agent has two or more groups selected from the group consisting of epoxy, oxetane, carbodiimide, hydrazide, oxazoline, aziridine, isocyanate, N-methylol, keteneimine and isocyanurate groups.

13. The process according to claim 1 wherein the substrate has been roughened or the substrate comprises an ink receptive coating.

14. The process according to claim 13 wherein the ink receptive coating comprises a hydrophilic polymer and a hydrophobic polymer.

15. An ink jet printer comprising
   (a) a first chamber and an ink, wherein said ink is present in the first chamber; and
   (b) a second chamber comprising a pigment-free formulation comprising a crosslinking agent and an aqueous medium;
wherein the ink comprises polymer-encapsulated pigment particles and an aqueous medium wherein
   (i) the said particles are dispersed in the aqueous medium; and
   (ii) the said particles comprise a carboxy-functional dispersant crosslinked around a pigment core by a crosslinking agent.

16. The ink jet printer according to claim 15 which further comprises a means for heating a substrate to which the ink and the pigment-free formulation have been applied.

17. An ink jet printer cartridge comprising:
(a) a first chamber and an ink, wherein said ink is present in the first chamber; and
(b) a second chamber comprising a pigment-free formulation comprising a crosslinking agent and an aqueous medium; wherein the ink comprises polymer-encapsulated pigment particles and an aqueous medium wherein
  (i) the said particles are dispersed in the aqueous medium; and
  (ii) the said particles comprise a carboxy-functional dispersant crosslinked around a pigment core by a crosslinking agent.

* * * * *